(12) United States Patent
Wainblat et al.

(10) Patent No.: US 10,887,110 B2
(45) Date of Patent: Jan. 5, 2021

(54) METHOD FOR DIGITAL SIGNING WITH MULTIPLE DEVICES OPERATING MULTIPARTY COMPUTATION WITH A SPLIT KEY

(71) Applicant: UNBOUND TECH LTD, Petah Tiqva (IL)

(72) Inventors: George Wainblat, Tel Mond (IL); Oz Mishli, Kfar Saba (IL); Guy Pe'er, Talmey Yechiel (IL); Valery Osheter, Ashdod (IL); Saar Pe'er, Oranit (IL); Michael Kraitsberg, Rehovot (IL); Alexander Presman, Ramat-Gan (IL); Yaniv Refael, Ness Ziona (IL)

(73) Assignee: UNBOUND TECH LTD, Petah Tiqva (IL)

( * ) Notice: Subject to any disclaimer, the term of this patent is extended or adjusted under 35 U.S.C. 154(b) by 148 days.

(21) Appl. No.: 16/199,273

(22) Filed: Nov. 26, 2018

(65) Prior Publication Data

US 2020/0169410 A1 May 28, 2020

(51) Int. Cl.
*H04L 9/32* (2006.01)
*H04L 9/08* (2006.01)
*H04L 9/30* (2006.01)
*H04L 9/14* (2006.01)

(52) U.S. Cl.
CPC ............ *H04L 9/3247* (2013.01); *H04L 9/085* (2013.01); *H04L 9/14* (2013.01); *H04L 9/30* (2013.01); *H04L 9/3268* (2013.01)

(58) Field of Classification Search
None
See application file for complete search history.

(56) References Cited

U.S. PATENT DOCUMENTS

2018/0359097 A1* 12/2018 Lindell .................. H04L 9/008

* cited by examiner

*Primary Examiner* — Brandon S Hoffman
(74) *Attorney, Agent, or Firm* — Soroker Agmon Nordman

(57) ABSTRACT

The present invention disclosed a method operable on a multiparty signing system for performing a multiparty signing act on a digital content. The multiparty signing system disclosed in the present invention comprises at least two multiparty signing servers configured with methods to perform the multiparty signing act of a digital content to sign. The multiparty signing system can be configured to perform the multiparty signing act by a private signing key split to at least two key shares, wherein each key share is held by each of the at least two multiparty signing servers. The multiparty signing system is also configured to communicate with at least one computerized node employed to conduct an approval process for approving the multiparty signing act. The approval process can be configured to conduct the approval process by employing a secure multiparty computation, wherein the approval process is configured to utilize secret shares held by the at least one computerized node. In such cases, the multiparty signing act is approved in case the approval process ended successfully.

16 Claims, 8 Drawing Sheets

METHOD FOR DIGITAL SIGNING WITH MULTIPLE DEVICES OPERATING MULTIPARTY COMPUTATION WITH A SPLIT KEY

FIELD OF THE INVENTION

The present invention relates to a multiparty method in which a signature on a certain digital content is successively generated after multiparty approval process.

BACKGROUND OF THE INVENTION

Multi-signature is a digital signature scheme which allows a group of users to sign a single document. Usually, a multi-signature algorithm produces a joint signature that is more compact than a collection of distinct signatures from all users. In some cases, a multi-signature refers to requiring more than one participant to authorize a signing act. In some cases, digital signing systems are configured to allow digital signing act on digital content which can be computer codes, digital forms, documents, and the like. A digital signing act on a digital content can only be performed by an entity proving the authenticity of this digital content. Hence, the risk is elevated in case the single authority fails or cheats. Yet, in the modern world of the internet, securing digital signing is required in order to control the digital signing and the authorization rules.

In some cases, a multi-signature algorithm can take place without any control nor multi-signature algorithm on the signing process. The method of utilizing a private key for signing the digital content, cannot provide the signee any control nor structure to prove that the signing is necessary, approved, or required.

SUMMARY OF THE INVENTION

The present invention disclosed a method operable on a multiparty signing system for performing a multiparty signing act on a digital content. The multiparty signing act can comprise the processes and the methods for generating a signed version of a digital content. The signed version of the digital content may comprise the signed digital content, in some other case, the signed version of the digital content may comprise the digital content and a signed hash value computed by the any of the multiparty signing servers, of the multiparty signing system. In some cases, the signed version of the digital content may comprise a hash value of the digital content. In some cases, the signed version of the digital content may also comprise a signed hash value. The multiparty signing system disclosed in the present invention comprises at least two multiparty signing servers configured to perform the multiparty signing act of a digital content to sign. The multiparty signing act can be followed by a generation of a signed version of the digital content, conducted by the multiparty signing system. The multiparty signing system can be configured to perform the multiparty signing act by a private signing key split to at least two key shares, wherein each key share is held by each of the at least two multiparty signing servers. In some cases, the multiparty signing system may receive the digital content to sign from a built service designed to provide such digital content for the multiparty signing act, as explained below.

The multiparty signing system is also configured to communicate with at least one computerized node employed to conduct an approval process for approving the multiparty signing act. The approval process can be configured to conduct the approval process by employing a secure multiparty computation, wherein the approval process is configured to utilize secret shares held by the at least one computerized node. In such cases, the multiparty signing act is approved in case the approval process ended successfully. In some cases, the approval process employs an authentication process authorized to approve the multiparty signing act. In such cases, the multiparty signing act is approved in case the authentication process has ended successfully by a quorum of the at least one computerized node. In some cases, the authentication process is based on a threshold cryptosystem. In such cases, the authentication process can be configured to end successfully in case the number of computerized nodes performed the successful authentication processes is not below the threshold number.

The multiparty signing system is also configured to associate a public signing key to the signed version of the digital content, wherein the public signing key is corresponding to the split private signing key. The multiparty signing system may be configured to send the signed version of the signed digital content, and the public signing key to a recipient to verifying that the signed version of the digital content is authentic. In some cases, the multiparty signing system may also be configured to associate the public signing key with a digital certificate, associate said digital certificate with the signed version of the digital content and then, send the signed version of the digital content with the certificate to the recipient for verifying that the signed version of the digital content is authentic.

The multiparty signing system is also configured with memory unit coupled with a computing unit to perform the method of the multiparty signing act. The computing unit may be instructed to carry out an operation for obtaining the digital content to sign and conducting the approval process with the at least one computerized node. In some cases, obtaining the digital content to sign may comprise a process of communicating and receiving the digital content from a build service as explained below. The method of the multiparty signing act may also be followed by a method of conducting the approval process and then, upon approval process ending successfully, a process of generating a signed version of the digital content may follow. The method of the multiparty signing act may be performed by the at least two multiparty signing servers employing a secure multiparty computation, wherein the multiparty signing act is performed with a private signing key split to at least two key shares, and wherein each key share is held by each of the at least two multiparty signing servers.

The multiparty signing system may also comprise a method for conducting an approval process by the multiparty signing system communicating with the at least one computerized node, by employing a secure multiparty computation, wherein the approval process utilizes secret shares held by the at least one computerized node for approving the multiparty signing act. In such cases, the multiparty signing system comprises an approval process designed to approve the multiparty signing act. In some cases, the method of the approval process may comprise a process of employing an authentication process authorized to approve the multiparty signing act. In such cases, the multiparty signing act is approved in case the authentication process has ended successfully by a quorum of the at least one computerized node. In some cases, the authentication process may be carried out based on a threshold cryptosystem configured to end successfully in case the number of computerized nodes performed the successful authentication processes is not below the threshold number.

The multiparty signing system can also carry out a method designed to associate a public signing key to the signed version of the digital content, wherein the public signing key is corresponding to the split private signing key. The multiparty signing system may can comprise a process designed to send the signed version of the signed digital content, and the public signing key to a recipient to verifying that the signed version of the digital content is authentic. In some cases, the multiparty signing system may also be configured with a method designed to associate the public signing key with a digital certificate, associate said digital certificate with the signed version of the digital content and then, send the signed version of the digital content with the certificate to the recipient for verifying that the signed version of the digital content is authentic.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION OF THE INVENTION

The present invention discloses a method operable by a multiparty signing system configured to utilize a multiparty computation for a multiparty signing act. The multiparty signing act comprises the processes and the methods for generating a signed version of a digital content. The multiparty signing act can comprise alter alia a multiparty digitally signing process, required for digitally sign on a digital content by using a digital signature. In some cases, the multiparty signing act may comprise other processes such as encryption, decryption, and other multiparty security-related functions and/or cryptographic methods utilized for presenting the authenticity of digital messages or documents.

The term connected "approve" or "approval process" herein depicts a process conducted to approve the multiparty signing act. The "approve" or "approval process" are conducted with a quorum of computerized nodes configured to approve the multiparty signing act on a certain digital content. In some cases, the "approval process" may employ an authentication processes of computerized nodes configured to perform the authentication process according to a configuration held and conducted by the multiparty signing system. The multiparty signing system is configured to be authorized to perform the multiparty signing act upon successful authentication processes of the computerized nodes of the quorum. In some cases, a quorum of computerized nodes can be configured to utilize a software or hardware mark configured to signal that the authentication processes ended successfully. For example, a mark can be such as a bit which can be either on or off.

The multiparty signing system can also be configured to employ a group, denoted herein as a quorum, of computerized nodes configured to approve the multiparty signing act on a certain digital content. In some cases, an authentication process may be conducted by the multiparty signing system to validate the identity of the computerized nodes configured to be associated with the quorum. The computerized nodes associated with the quorum can be configured as entities authorized to approve the multiparty signing act. In some cases, the computerized nodes forming the approval processes may be connected off-line and thereby conduct the cryptographic tasks of the threshold authentication, independently without any communication with other entities on external networks. The term connected "off-line" herein depicts a connection method wherein the computerized nodes configured to guarantee to be connected with each other or with the multiparty signing system during the cryptographic process but are not synchronized nor connected to each other nor to the multiparty signing system at the same time, during the cryptographic process.

Figure 1:
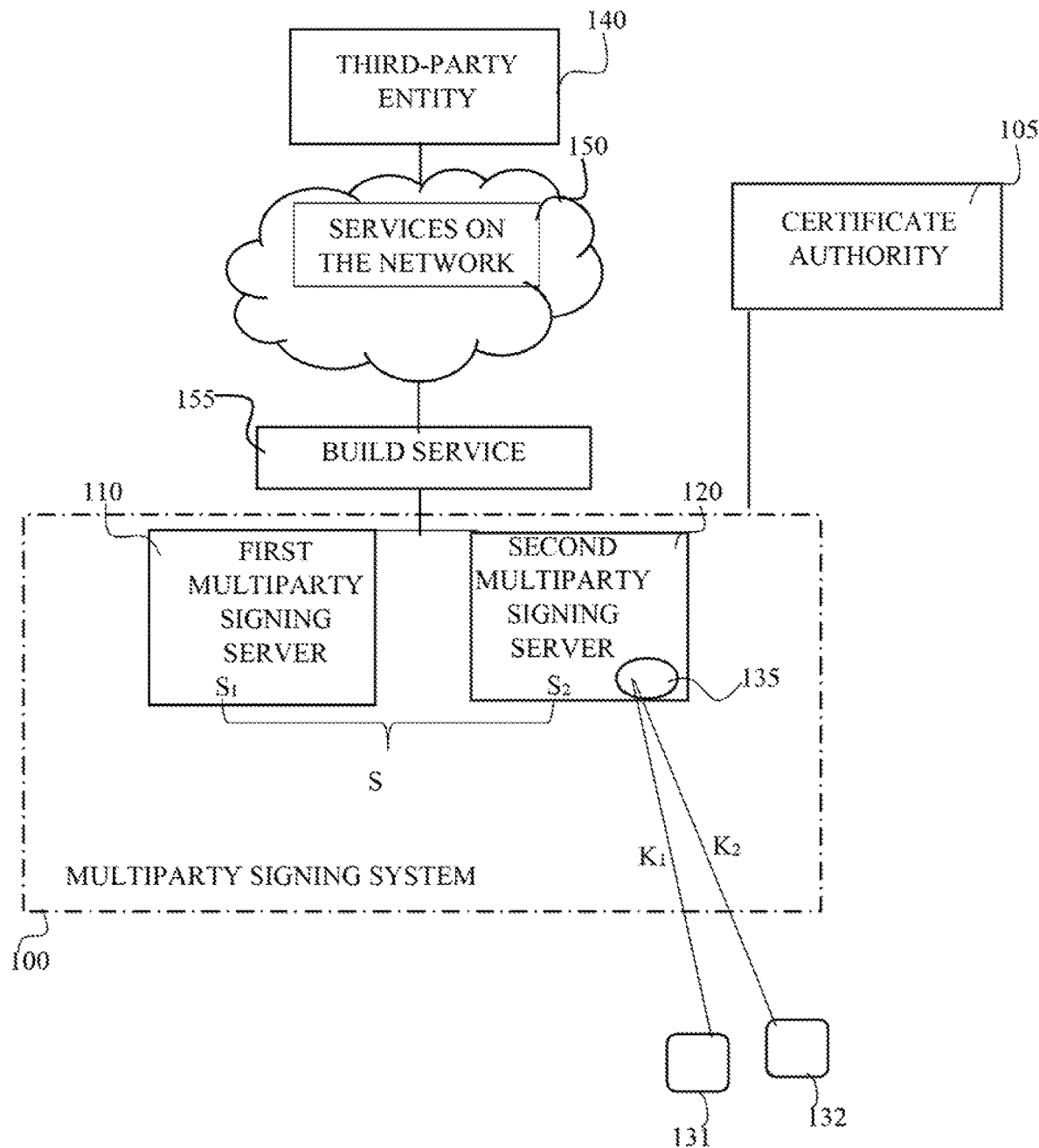
FIG. 1 shows a multiparty signing server configured to conduct an approval process based on multiparty computation for a multiparty signing act, according to exemplary embodiments of the present invention.

FIG. 1 shows a multiparty signing server configured to conduct an approval process based on multiparty computation for a multiparty signing act, according to exemplary embodiments of the present invention. FIG. 1 shows a multiparty signing system 100, operable on a computerized device, configured to generate a signed version of a digital content by performing the multiparty signing act on the digital content by employing a split private key S, denoted herein as a private signing key S. The multiparty signing system 100 comprises at least two multiparty signing parties, denoted as a first multiparty signing server 110 and second multiparty signing server 120. In some cases, the multiparty signing system 100 is configured such that the private signing key S is split between $S_1$ held by the first multiparty signing server 110 and $S_2$ held by the second multiparty signing server 120. Thus, the first multiparty signing system 100 can be configured to utilize a secure multiparty computation, denoted herein as MPC, to generate a signing key S split to share $S_1$ and $S_2$, wherein $S_1$ is held by the first multiparty signing server 110 and $S_2$ is held by the second multiparty signing server 120, without ever bringing $S_2$, and $S_1$ together nor revealing the signing key S.

The multiparty signing system 100 is configured to perform the multiparty signing act with the split key S by an MPC operated by the first multiparty signing server 110 and second multiparty signing server 120. Such a multiparty signing act may be designed to employ some computer operable processes and instructions that when executed cause to digitally sign a digital content and to generate a signed version of the digital content. In some cases, such computer operable processes and instructions can implement a number of computer tasks designed to execute the processes required for the digital signing act with the split key S. The executed processes required for the digital signing act may employ methods of MPC which utilize the share $S_1$ and the share $S_2$ in the multiparty signing act, without ever bringing $S_2$ and $S_1$, together nor revealing the signing key S. In some cases, the signed version of the digital content may comprise the signed digital content, in some other case, the signed version of the digital content may comprise the digital content and a signed hash value computed by the any of the multiparty signing servers, of the multiparty signing system 100.

The first multiparty signing server 110 and/or the second multiparty signing server 120 may be computers, personal computers, servers, mobile computerized devices, mobile telephone devices designed and configured to execute computerized process and the like, designed to operate MPC. In possible embodiments of the present invention the first multiparty signing server 110 and/or the second multiparty signing server 120 may be implementations of virtual machines, or emulations of a computer systems which are operated on computer architectures providing functionality of physical computers.

In some cases, the communication between the first multiparty signing server 110 and second multiparty signing server 120 can be based on telecommunication networks. In possible embodiments of the present invention, the key shares $S_1$ and $S_2$ of the private signing key S utilized in the multiparty signing act can be shared between the second multiparty signing server 120 and the first multiparty signing server 110 by using additive secret sharing. In possible embodiments of the present invention, the key shares $S_1$ and $S_2$ may also be split to multiple shares, wherein at least one of the key shares is held by the first multiparty signing server 110. In such cases, the first multiparty signing server 110 can be configured to jointly preform multi-signature which allows a group of signing partners and the first multiparty signing server 110 to jointly sign a single file of digital content, by using the private signing key S, without ever revealing the signing key S.

The multiparty signing system 100 can also be configured to employ a quorum 135 to approve the multiparty signing act on a certain digital content. Thus, the multiparty signing system 100 can be engaged with computerized node 131 and computerized node 132 associated with quorum 135. The computerized node 131 and computerized node 132 can be configured as entities authorized to approve the multiparty signing act. In some cases, an authentication process is configured to be conducted by the multiparty signing system 100 to validate the identity of the computerized node 131 and/or computerized node 132. For example, the first multiparty signing server 110 may conduct an authentication process for the computerized node 131 and computerized node 132 and upon a successful authentication process, the multiparty signing system 100 may conduct the multiparty signing act with the split key S, as aforementioned.

In some cases, the multiparty signing system 100 may be configured to utilize a threshold cryptosystem in the authentication process of the computerized nodes of the quorum 135. For example, the first multiparty signing server 110 can be configured to communicate with the computerized node 131 and computerized node 132 and conduct the authentication process. In some other cases, the second multiparty signing server 120 can be configured to communicate with the computerized node 131 and computerized node 132 and conduct the authentication process. The quorum 135 can be configured to use a secret share $K_1$ held by the computerized nodes 131 and secret share $K_2$ held by the computerized nodes 132 for the threshold authentication process. In some cases, the shares $K_1$ and $K_2$ may be cryptographic key shares utilized in the threshold authentication process. For example, in case a threshold authentication process requires two computerized nodes to approve a multiparty signing act, a successful authentication process based on MPC between computerized node 131 and the first multiparty signing server 110 can satisfy the authentication requirement needed to approve the multiparty signing act. In some other cases, wherein the threshold authentication process requires only one computerized node to approve a multiparty signing act, an authentication process based on MPC between computerized node 132 and the multiparty signing system 100 can satisfy the authentication requirement needed to approve the multiparty signing act. In yet another example, the first multiparty signing server 110 can conduct the threshold authentication process with the computerized nodes 132 to satisfy the authentication requirement needed to approve the multiparty signing act.

In some embodiments of the present invention, the multiparty signing system 100 may be configured to obtain the digital content to digitally sign from a build service 155. In some cases, the build service 155 may be operated on a standalone computerized device. In such cases, the build service 155 may be configured to communicate with the multiparty signing system 100 over telecommunication networks. Thus, the build service 155 may be configured to hand over the digital content to sign to the multiparty signing system 100 by sending the digital content over the network. In possible embodiments of the present invention, the digital content undergoing the multiparty signing act can be messages, documents or any electronic content intended to be utilized by a computerized device or computerized devices, in an electronic form. For example, in some cases the digital content to sign may be a computer code defined as a set of instructions forming a computer program which can be executed by a computerized device.

In some embodiments of the present invention, the digital content to sign may be a hash value computed from a digital content held by the build service 155. Thus, the build service 155 can be configured to compute a hash value from the digital content to sign, and then hand over the hash value to the multiparty signing system 100 configured to obtain the hash value. In some cases, such a hand over of the hash value may be sending the hash value over telecommunicating network. In some cases, such a hand over of the hash value may be inserting the hash value into a computer-readable medium configured to allow access to the hash value for the multiparty signing system 100. The multiparty signing system 100 may be configured to digitally sign the hash value obtained from the build service 155. In some other embodiments of the present invention, the build service 155 may be configured to hand over the entire digital content to sign to the multiparty signing system 100. For example, in case the digital content is a digital document comprising any electronic media content which are intended to be used in either an electronic form, or as a printed output. In such an exemplary case, the build service 155 may be configured to hand over the entire digital document and the multiparty signing system 100 may be configured to sign the entire handed digital content. Thus, the multiparty signing system 100 can be conduct the multiparty signing act on any computerized readable form.

In some cases, the digital content to sign may be obtained at the build service 155 via a computerized readable medium designed to store digital content. For example, a person operating the build service 155 can utilize a computer digital medium such as data storage device, memory stick, memory card, memory, computer parallel communication device, electromechanical data storage device, and the like, to provide the build service 155 with a digital content to sign.

In some cases, the multiparty signing system 100 may also be configured to communicate with a certificate authority 105, denoted as CA 105. The multiparty signing system 100 can be configured to utilize digital certificates to prove the multiparty signing system 100 ownership of a public signing key. For example, the first signing server 110 may be configured to communicate with the CA 105 and request associating a public signing key corresponded to a private signing key S, with a digital certificate. In such an exemplary case, the CA 105 can be configured to communicate with the first signing server 110 and issues digital certificates associated with public signing keys generated by the multiparty signing system 100. The multiparty signing system 100 may also be configured to generate a key pair of a private signing key S split to $S_1$ and $S_2$, and a corresponded public signing key, wherein the public signing key is associated with the requested digital certificate.

In some cases, the multiparty signing system 100 can be configured to hand over the digital certificate associated with a public signing key to the build service 155. In some cases, the multiparty signing system 100 may hand over the digital certificate associated with a public signing key and the signed version of the digital content, signed with the private signing key S split to $S_1$ and $S_2$, to the build service 155, wherein the private signing key S is corresponded to the public signing key associated with the digital certificate. In some cases, the build service 155 may be configured to send the signed version of the digital content, and the digital certificate to a third-party entity 140.

In some cases, the third-party entity 140 receiving the signed version of the digital content may be any recipient such as a computerized device configured to operate software applications for utilizing, executing, manifesting, or printing the received signed version of the digital content. In some other cases, the third-party entity 140 may be a computerized device configured to obtain and store the signed version of the digital content in a computer-readable medium. In possible cases, the signed version of the digital content may be an executable file or executable program which causes a computer to perform indicated tasks according to instructions encoded in the executable file or executable program. For example, the third-party entity 140 receiving the signed version of the digital content may operate the signed version as an executable file designed to install software programs configured to be operated by a recipient such as the third-party entity 140.

In some cases, the build service 155 may send the signed version of the digital content and the digital certificate to a dedicate service on the network 150. In such cases, the service on the network 150 may be configured to receive such signed versions of the digital content from any entity on the network and send further to a recipient such as third-party entity 140. In some cases, the service on the network 150 receiving the signed version of the digital content may be configured to send the received signed version of the digital content to other entities operating on telecommunication networks. Such telecommunications networks may be the internet, local area network, wireless-based networks, and the like. For example, the service on the network 150 may comprise a web service configured to communicate and send content such a signed version of the digital content to other entities communicating over the network.

In some cases, such a multiparty signing system may be operated on a computerized device comprising processing unit configured with instructions for carrying out the processes of the multiparty signing system. The processes of the multiparty signing system can comprise alter alia the computerized processes required for the operation of the multiparty signing system. The processing unit can be coupled with a memory unit and in some cases, with a computer-readable medium required for the operation of the processing unit, in order to carry out the processes of the multiparty signing system. In some embodiments of the present invention, the multiparty signing system is configured to operate on any one of the multiparty signing servers, such as the first the multiparty signing server 110, and the second multiparty signing server 120. In some other possible embodiments of the present invention, some of the computerized processes of the multiparty signing system may be operated on a standalone computerized device (not shown) configured to communicate with the multiparty signing servers.

Figure 2:
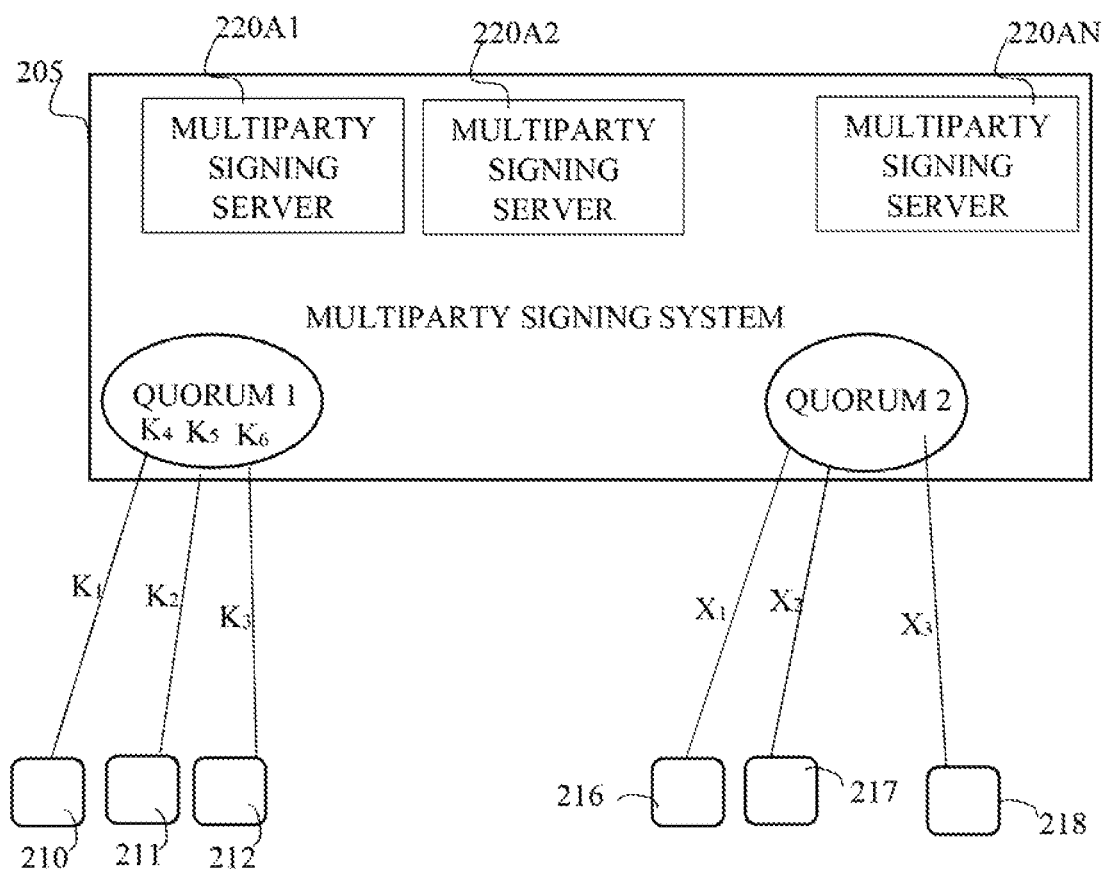
FIG. 2 shows a multiparty signing system configured to utilize quorums for the approval processes of a multiparty digital signing act, according to exemplary embodiments of the present invention.

FIG. 2 shows a multiparty signing system configured to utilize quorums for the approval processes of a multiparty digital signing act, according to exemplary embodiments of the present invention. FIG. 2 shows a multiparty signing system 205 configured to perform the multiparty signing act on a digital content by utilizing a private signing key. The multiparty signing system 205 comprises multiparty signing parties, denoted as multiparty signing server 220A, multiparty signing server 220A2, and multiparty signing server 220AN. The multiparty signing system 205 is configured with a private signing key split to at least two shares, wherein one key share is held by a multiparty signing server 220A1 and another key share is held by a multiparty signing server 220A2. In some cases, the private signing key is split to multiple shares held by the multiparty signing parties such as multiparty signing server 220A1, 220A2, and up to 220AN wherein N is a natural number representing the number of multiparty signing parties holding the private key shares.

In some embodiments of the present invention, the multiparty signing system 205 can be configured to employ a threshold cryptosystem utilized for the authentication process which approves the multiparty signing act. The multiparty signing system 205 can be configured with quorum 1 required to approve multiparty signing act. Quorum 1 can be configured to employ computerized nodes 210, 211, and 212 which hold secret shares $K_1$, $K_2$, and $K_3$ respectively. In some cases, the multiparty signing system 205 may also be configured to hold secret shares $K_4$, $K_5$, and $K_6$. The multiparty signing system 205 may be configured to utilize at least one of the shares $K_4$, $K_5$, and $K_6$ for the authentication process which approves the multiparty signing act.

The computerized nodes 210, 211, and 212 can be a computerized system such as a computer, computerized server, computerized mobile telephone, personal computer, computer unit, tablet personal computer, and the like. Quorum 1 can hold a configuration which encodes the threshold rules defining the number of computerized nodes required for the threshold authentication process, denoted as a threshold number. For example, the threshold number can be at least a two (2). In such a case, at least two participations of any two computerized nodes configured in quorum 1 can jointly satisfy the requirement of the threshold authentication, and thereby approve the multiparty signing act. In such a case, the two participations of the threshold authentication process can be any two computerized nodes among the computerized nodes 210, 211, 212, and the multiparty signing system 205. In some cases, the key shares $K_4$, $K_5$ and $K_6$ held by the multiparty signing system 205 may be held by any one of the multiparty signing servers 220A1, 220A2, or 220AN.

The multiparty signing system 205 can also be configured to perform the multiparty signing act on a certain digital content upon successful threshold authentication process. In some cases, a process of two factor authentication may be required for the computerized nodes 210, 211, and 212 to collectively verify password or jointly verify a cryptographic key. In possible embodiments of the present invention, quorum 1 is configured such that, an MPC with the multiparty signing system 205 is required at the threshold authentication process to collectively verify password or jointly verify a cryptographic key, as aforementioned. In some cases, the threshold authentication process may require a digital signing operation or decrypting an encrypted signature for performing a successful threshold authentication process.

In some embodiments of the present invention, the quorum 1 may be configured such that, the multiparty signing system 205 has no direct control or connection to the computerized nodes 210, 211, or 212. In such cases, the computerized nodes 210, 211, or 212 forming the approval processes may be connected off-line and thereby conduct the cryptographic tasks of the threshold authentication, independently without any communication with other entities on external networks. In some cases, the cryptographic process may be sending a secret or a message, receiving a secret or a message, conducting an MPC, and the like.

The multiparty signing system 205 can be configured with quorum 2 required to approve multiparty signing act. Quorum 2 is configured to employ computerized nodes, 216, 217, and 218 which hold secret shares $X_1$, $X_2$, and $X_3$ respectively. In some cases, the shares $X_1$, $X_2$, and $X_3$ may be cryptographic key shares. Quorum 2 can also be configured with a threshold number of computerized nodes required for the threshold authentication, as aforementioned. In some cases, the authentication process may require a predefined threshold number of computerized nodes which can collectively verify passwords. In some other cases, such quorum 2 can collectively verify a password and then generate tokens which can be utilized for the authentication process. In one aspect of the present invention, the computerized nodes may be configured with a process of two factor authentication for the verification of the password, instead of digital signatures. For example, the computerized nodes, 216, 217, and 218 may be configured to scan a matrix barcode, also termed a two-dimensional barcode to transfer the secret shares $X_1$, $X_2$, and $X_3$ respectively.

Figure 3:
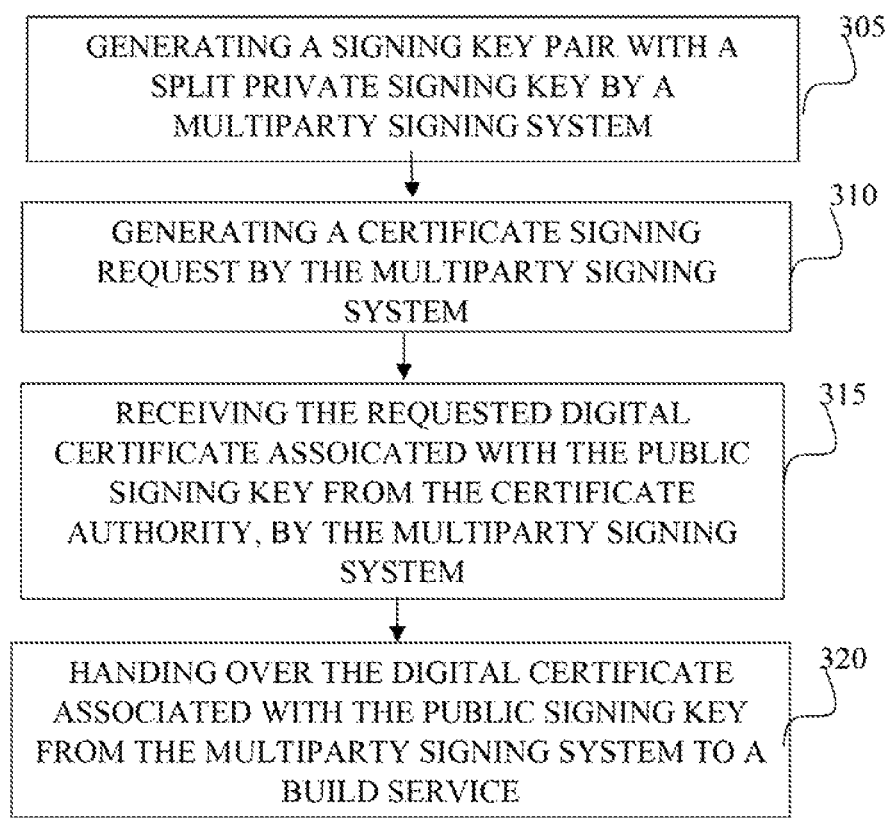
FIG. 3 shows a flowchart describing a computerized process of generating deploying key pairs for the purpose of performing a multiparty signing act, according to exemplary embodiments of the present invention.

FIG. 3 shows a flowchart describing a computerized process of generating key pairs for the purpose of performing a multiparty signing act, according to exemplary embodiments of the present invention. At step 305 a multiparty signing server generates a key pair configured to be used in an asymmetric cryptography system employing public signing key and private signing key. The signing key is generated split to a at least two key shares. The key pair generation process can be configured such that the private signing key is generated in a split fashion without ever revealing the entire private signing key. The key share of the private signing key can be distributed and held among the multiparty signing parties.

At step 310 the multiparty signing server generates a certificate signing request associated with the public signing key to a CA. The CA may be configured to issue digital certificates associated with public keys. In some embodiments of the present invention, generating the key pair and requesting the digital certificate may be performed by other server than the multiparty signing server. For example, the multiparty signing server may communicate over the network, with a server configured to manage the digital content to sign. In some cases, such a server may also be configured to send the certificate signing request to a CA.

At step 315 the multiparty signing server receives the digital certificate associated with the public signing key and issued by the CA. In some cases, the digital certificate may be associated with a text message received by the multiparty signing server. In some cases, the multiparty signing server may store the digital certificate associated with the public signing key in a dedicated computer-readable medium designed and configured to store digital certificates. In some cases, the multiparty signing server may also be configured with a software application for managing the stored certificates.

At step 320 the multiparty signing server hands over the digital certificate associated with the public signing key to a build service. In some cases, step 320 is optional and the multiparty signing server may hold the digital certificate associated with the public signing key. In some other cases, the multiparty signing server may hand over the digital certificate to the build service. In some cases, the build service may store the digital certificate in a computer-readable medium.

Figure 4A:
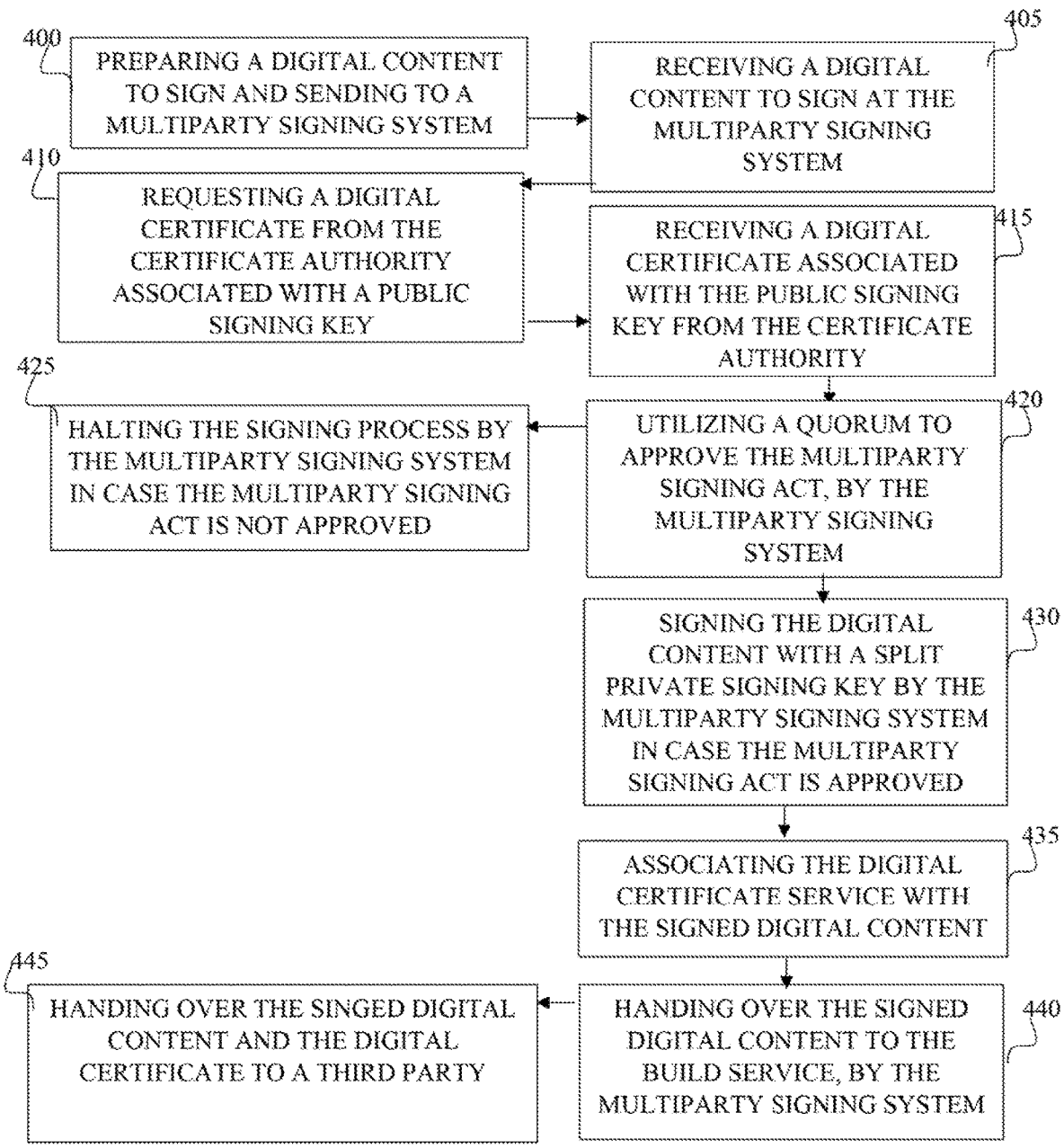
FIG. 4A shows a flowchart describing a computerized process of signing digital content by a split private key held by the multiparty signing system, according to exemplary embodiments of the present invention.

FIG. 4A shows a flowchart describing a computerized process of signing digital content by a split private key held by the multiparty signing system, according to exemplary embodiments of the present invention. At step 400 a digital content to sign can be prepared. In some cases, such a digital content may be prepared by a build service. In some cases, the preparing process of the build service may comprise a utilization of a hash function to compute a hash value from the digital content. At step 405 a multiparty signing system obtains a digital content to sign, as aforementioned. In some cases, the build service can be operated on a standalone computerized device communicating with the multiparty signing system. In some other cases, the build service can be operated at the same computerized device on which the multiparty signing system is operated. At step 410 the multiparty signing system requests a digital certificate from the certificate authority associated with a public signing key. Such a public signing key is corresponding to a split private signing key held by the multiparty signing entities of the multiparty signing system as aforementioned. At step 415 the multiparty signing system obtains the digital certificate associated with the public signing key, from the certificate authority.

At step 420 the multiparty signing system utilizes an approval process employing a quorum to approve the multiparty signing act. At step 425 the multiparty signing system halts and does not initiate the multiparty signing act in case the multiparty signing act is not approved by the quorum in the approval process. At step 430 the multiparty system utilizes a multiparty signing to perform the multiparty signing act and to generate a signed version of the digital content by using the split private signing key, in case the multiparty signing act is approved. In some cases, the multiparty signing server and the signing parties may conduct an MPC to digitally sign the digital content by the split private key. At step 435 the multiparty signing system associates the signed version of the digital content with a public signing key, wherein the public signing key is corresponded to the private signing key used to digitally sign the digital content. In some cases, associating the public signing key with the signed version of the digital content certificate associated with the public signing key may involve using a digital certificate. Such a digital certificate may be a digital certificate received from an external CA or a self-signed certificate associated with a public key, as aforementioned. At step 440 the multiparty signing system hands over the signed version of the digital content and the certificate associated with the corresponding public key, to a recipient. In some cases, the recipient can be a third-party which may utilize the public signing key associated with the digital certificate to validate the multiparty signing server reliability. In some cases, handing over the signed version of the digital content and the certificate may involve communicating over a network with the third-party. In some other cases, the signed version of the digital content and the certificate may be sent to a build service first. In such a case, the build service may take hand over the signed version of the digital content and the certificate to the third-party. In some cases, the build service may utilize a service on the network for communicating with the third-party, as aforementioned.

Figure 4B:
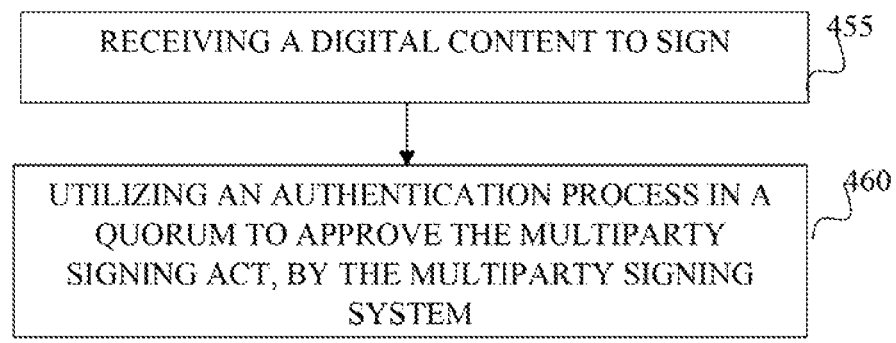
FIG. 4B shows a flowchart describing the computerized process, denoted as approval process, for using a quorum for approving a multiparty signing act by a multiparty signing system, according to exemplary embodiments of the present invention.

FIG. 4B shows a flowchart describing the computerized process, denoted as approval process, for using a quorum for approving a multiparty signing act by a multiparty signing system, according to exemplary embodiments of the present invention. At step 455 a digital content to sign is obtained. In some cases, the digital content may be obtained by a computerized process operated by the multiparty signing system. Such a digital content to sign may be a digital file, or a hash value resultant of hash computing, as aforementioned. In some cases, the digital content to sign can be provided by a build service. In some other cases, the digital content to sign may be provided by uploading a digital content to the multiparty signing system. At step 460 the multiparty signing system utilizes an authentication process in a quorum for approving a multiparty signing act. The quorum utilized for the approval process may be a quorum of computerized nodes configured to approve such processes, as aforementioned. In some cases, the approval process can be performed by conducting an MPC among the computerized nodes configured in the quorum, wherein the computerized nodes hold secret shares utilized in the MPC. In some cases, a process of two factor authentication may be required for the computerized nodes of the quorum, and the system receives a digital content to sign. In some cases, the threshold authentication process may require a digital signing operation or decrypting an encrypted signature for performing a successful a threshold authentication process.

Figure 5:
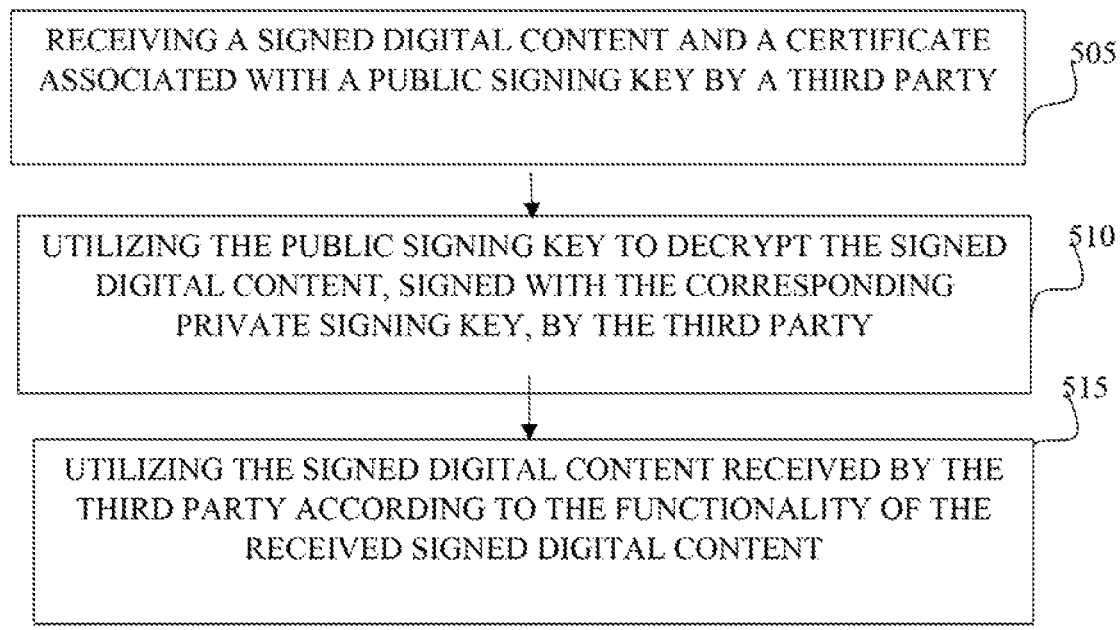
FIG. 5 describes a computerized process utilized by a recipient for verifying the signed version of the digital content received from a multiparty signing server, according to exemplary embodiments of the present invention.

FIG. 5 describes a computerized process utilized by a third-party server for verifying the signed version of the digital content received from a multiparty signing system, according to exemplary embodiments of the present invention. At step 505 a third-party server receives a signed version of the digital content associated with the public key. In some cases, such a signed version of the digital content may be associated with a digital certificate associated to the public signing key. In some cases, the signed version of the digital content may be the digital content with a hash value and signed hash value and/or other associated metadata. At step 510 the third-party server validates the signature of the signed digital content. In some cases, the validation may comprise a utilization of a hash function to compute a hash value from the digital content. The third-party server utilizes the public signing key associated with the digital certificate to decrypt the signature of the obtained signed digital content, signed with the corresponding private signing key. At step 515 the third-party server utilizes the received signed version of the digital content according to the functionality of the received signed version of the digital content, as aforementioned.

Figure 6:
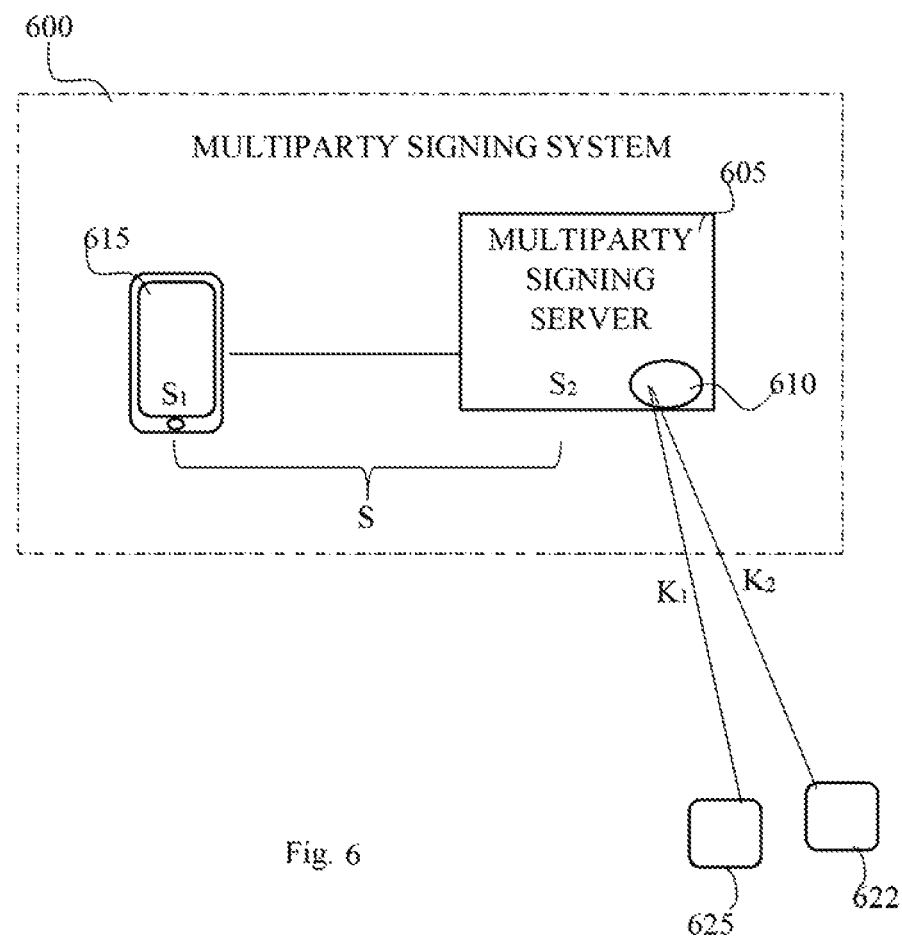
FIG. 6 discloses a structure and configuration of a computerized device functioning as a multiparty signing server, according to exemplary embodiments of the present invention.

FIG. 6 discloses a multiparty signing system comprising a multiparty signing server and computerized mobile device functioning as multiparty signing entities, according to exemplary embodiments of the present invention. FIG. 6 shows a multiparty signing system 600 comprises at least two multiparty signing parties, denoted as a multiparty signing server 605 and a mobile device 615 operating as a multiparty signing entity. Such a mobile device may be a computerized mobile device such as, mobile telephone, a tablet personal computer, mobile computer, and the like. In some cases, the multiparty signing system 600 is configured such that the private signing key S is split between $S_1$ held by the multiparty signing server 605 and $S_2$ held by the mobile device 615. Thus, the multiparty signing system 600 can be configured to utilize a secure multiparty computation denoted herein as MPC, to generate a signing key S split to share $S_1$ and $S_2$, wherein $S_1$ is held by the multiparty signing server 605 and $S_2$ is held by the mobile device 615, without ever bringing $S_2$, and $S_1$ together nor revealing the signing key S. In some cases, the mobile device 615 may operate a software application designed to communicate with the multiparty signing server 605. Such a communication may be over the network, as aforementioned. For example, the multiparty signing server 605 may communicate over the network with the mobile device 615 for conducting the MPC required for the multiparty signing act.

Figure 7:
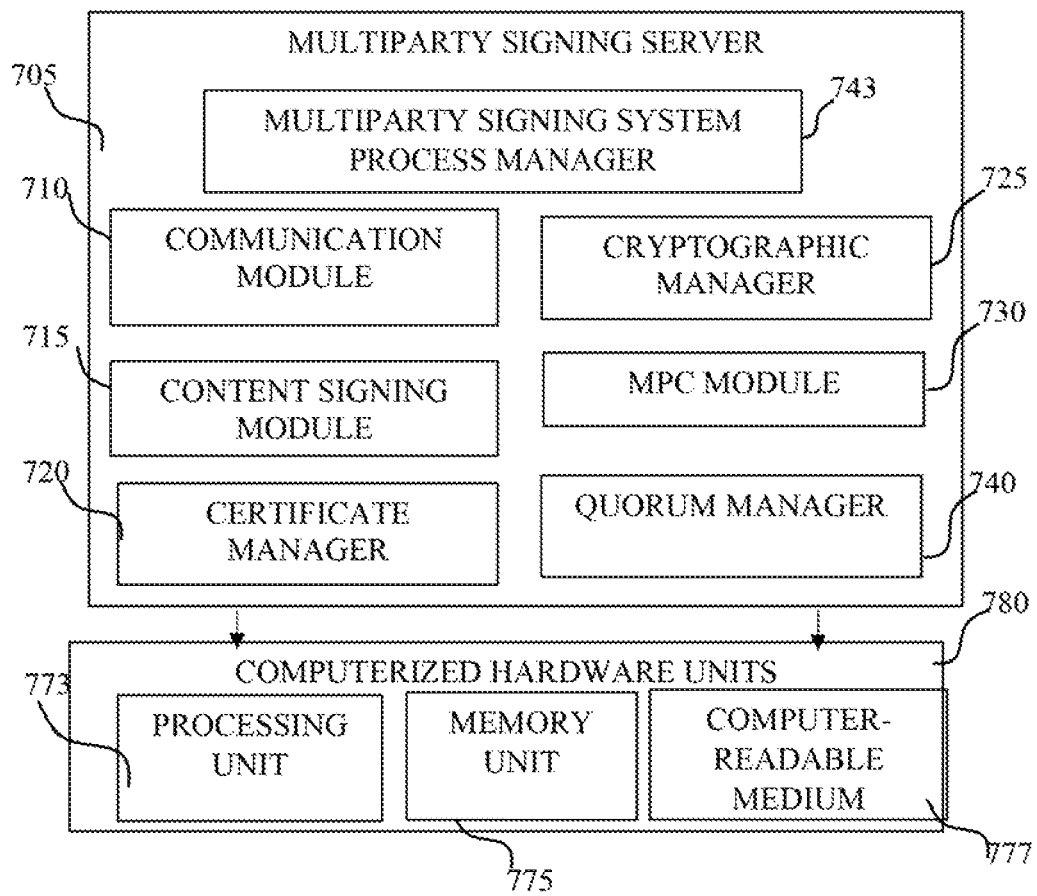
FIG. 7 discloses a structure and configuration of a computerized device functioning as a multiparty signing server, according to exemplary embodiments of the present invention.

FIG. 7 discloses a structure and configuration of a computerized device functioning as a multiparty signing server, according to exemplary embodiments of the present invention. FIG. 7 shows a multiparty signing server 705 designed to function and operate as the multiparty signing server disclosed above. The multiparty signing server 705 may be set of computerized module and processes operable on a computerized device comprising computer hardware units 780 designed to carry out the instructions and tasks of the multiparty signing server 705. The computer hardware units 780 comprises a processing unit 773, comprises at least one digital processor, coupled to a memory unit 775 and computer-readable medium 777. The processing unit 773 can be configured to receive instructions that when executed by the processing unit 773 cause the computerized device comprising computer hardware units 780 to operate. For example, in some cases, the processing unit 773 can be instructed to perform a multiparty signing act, or an approval process with a quorum. In some other exemplary cases, the processing unit 773 can be instructed to receive and store digital certificates, encrypt or decrypt text, store and restore data in the memory unit 775, and the like. The computer-readable storage medium 777 storing instructions that when executed by a computing unit 773 cause the multiparty signing server 705 to carry out the functionalities of the multiparty signing server as disclosed in the present invention. The multiparty signing server 705 comprises a communication module 710 designed to manage the communication operations over the telecommunication network. In some cases, the communication module 710 may operate network adapters or physical network interfaces to carry out the communication required for the operation of the multiparty signing server 705. For example, communication module 710 may control a network interface controller for communicating with the computerized nodes and the signing parties. The communication module 710 may also control the required communication between the multiparty signing server 705 and other entities on the network. Such entities may be a CA, a third-party entity, and the like.

The multiparty signing server 705 also comprises a content signing module 715 designed to manage the digital content for signing. In some cases, the content signing module 715 may be comprise a software application which embodied as a data structure designed to provide with the utilities required to manage the digital content signed by the multiparty signing server 705. For example, in some cases, the content signing module 715 may comprise system for storing signed version of the digital content, associate digital certificate with a signed version of the digital content, associate an identification of the third-parties which received the signed version of the digital content, and the like.

The multiparty signing server 705 also comprises a certificate manager 720 which can be a software module designed to store, manage and browse the contents of the digital certificate used in the multiparty signing of the multiparty signing server 705. The certificate manager 720 can be implemented as a module comprising options and interfaces required to control the certificates received from CA's, the trusted root CA's, the order ID of the certificate requests, and the like. The multiparty signing server 705 also comprises a cryptographic manager 725 designed to manage some of the cryptographic operations of the multiparty signing server 705. In some cases, the cryptographic manager 725 may be configured to generate the key pairs required for the multiparty signing acts, split and deploy the private keys, send certificate signing requests to CA's, and the like.

The multiparty signing server 705 also comprises an MPC module 730 designed to conduct the MPC required for be performed by the multiparty signing server 705. For example, the MPC module 730 may conduct the threshold authentication processes required for the multiparty signing act approval processes. In some cases, the MPC module 730 may be configured to carry out the authentication process and disapprove the multiparty signing acts, in case the threshold is not met. In some cases, the MPC module 730 may also conduct the MPC multiparty signing act on a digital content to sign, with the signing partner by using one key share held by the signing partner and another key share held by the multiparty signing server 705 without ever revealing the entire key. The multiparty signing server 705 also comprises a quorum manager 740 designed to manage and control the quorums. In some cases, a quorum defined in the quorum manger 740 may be configured with some specific computerized nodes employed for an approval process. In some cases, the quorum manager 740 may be operably interlocked with the MPC module 730 to conduct the MPC in a quorum. For example, in case a certain quorum defined in the quorum manager 740 is configured to employ a number of key shares, in an MPC process, the quorum manager 740 may utilize the MPC module 730 to operate the MPC among the computerized devices configured in the quorum and holding the key shares.

In some embodiments of the present invention, the multiparty signing server 705 may comprise a multiparty signing system process manager 743 designed to carry out some of the computerized processes of the multiparty signing system. In some cases, the computerized processes of the multiparty signing system may be controlling and setting the computerized nodes for the approval processes, electing the quorums and the authentication process therewith, receive information and data related to the multiparty signing system configuration, and the like.

While the disclosure has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings without departing from the essential scope thereof. Therefore, it is intended that the disclosed subject matter not be limited to the particular embodiment disclosed as the best mode contemplated for carrying out this invention, but only by the claims that follow.

The invention claimed is:

1. A multiparty signing system comprising:
    at least two multiparty signing servers configured to perform a multiparty signing act;
    a quorum comprising at least two computerized nodes, each node of the at least two computerized nodes stores a share of a secret, said quorum communicating with the at least two multiparty signing servers,
    said quorum is configured with instructions to conduct an approval process with the at least two computerized nodes by employing a secure multiparty computation to which the at least two computerized nodes input the shares of the secret and send an output of the approval process to the at least two multiparty signing servers;
    wherein the at least two multiparty signing servers are operable on at least one processing unit coupled with at least one memory unit, wherein the at least one processing unit is configured with the instructions to:
    obtain a digital content to sign;
    approve the multiparty signing act in case the approval process ended successfully;
    generate a signed version of the digital content by preforming the multiparty signing act on the received digital content to sign, by the at least two multiparty signing servers and the at least two computerized nodes of the quorum employing a secure multiparty computation, wherein the multiparty signing act is configured to be performed with a private signing key split to at least four key shares, wherein one key share is held by each of the at least two multiparty signing servers and one key share is held by each of the at least two computerized nodes of the quorum;
    associate the signed version of the digital content with a public signing key, wherein the public signing key is corresponding to the private signing key split to at least four key shares;
    send the signed version of the digital content, and the public signing key to a recipient to verifying that the signed version of the digital content is authentic.

2. The multiparty signing system of claim 1, wherein the approval process is configured to use an authentication process performed by at least a threshold number of the computerized nodes in the quorum, and wherein the multiparty signing act is approved in case the authentication process ended successfully.

3. The multiparty signing system of claim 2, wherein the authentication process used by the approval process is based on a threshold cryptosystem.

4. The multiparty signing system of claim 3, wherein the authentication process is configured to end successfully in case the number of computerized nodes in the quorum that performed the successful authentication processes is not below the threshold number.

5. The multiparty signing system of claim 1, wherein the public signing key is associated with a digital certificate associated with the signed version of the digital content.

6. The multiparty signing system of claim 5, wherein the digital certificate is also sent to a recipient for verifying that the signed version of the digital content is authentic.

7. The multiparty signing system of claim 1, further comprises multiple quorums, each quorum of the multiple quorums comprises at least two computerized nodes, each node holding a share of a secret.

8. The multiparty signing system of claim 1, wherein none of the at least two multiparty signing servers has no direct control or connection to the at least two computerized nodes when performing the approval processes;
wherein the at least two computerized nodes conduct the cryptographic tasks of the threshold authentication, independently without any communication with other entities on external networks.

9. The multiparty signing system of claim 1, further comprising a quorum manager designed to manage and control the quorum, wherein the quorum manger stores configuration of specific computerized nodes employed for the approval process.

10. The multiparty signing system of claim 1, wherein the shares of the secret are shares of a cryptographic key.

11. A method for performing a multiparty signing act by a multiparty signing system comprising at least two multiparty signing servers configured to perform a multiparty signing act and a quorum comprising at least two computerized nodes, each node of the at least two computerized nodes stores a share of a secret, said quorum communicating with the at least two multiparty signing servers, comprising:
obtaining a digital content to sign, by the at least two multiparty signing servers;
conducting an approval process by the at least two computerized nodes of the quorum by employing a secure multiparty computation to which the at least two computerized nodes input the shares of the secret and send an output of the approval process to the at least two multiparty signing servers;
approving the multiparty signing act, by the at least two multiparty signing servers, in case the approval process ended successfully;
generating, by the least two multiparty signing servers, a signed version of the digital content by performing the multiparty signing act on the received digital content to sign, by the at least two multiparty signing servers and the at least two computerized nodes of the quorum employing a multiparty secure multiparty computation, wherein the multiparty signing act is configured to be performed with a private signing key split to at least four key shares, and wherein one key share is held by each of the at least two multiparty signing servers and one key share is held by each of the at least two computerized nodes of the quorum;
associating the signed version of the digital content with a public signing key, by the least two multiparty signing servers, wherein the public signing key is corresponding to the private signing key split to at least four key shares;
sending, least two multiparty signing servers, the signed version of the digital content and the public signing key to a recipient to verifying that the signed version of the digital content is authentic.

12. The method of claim 11, wherein the approval process employs an authentication process performed by at least a threshold number of the computerized nodes in the quorum, and wherein the multiparty signing act is configured to be approved in case the authentication process ended successfully.

13. The method of claim 12, wherein the authentication process used by the approval process is based on a threshold cryptosystem.

14. The method of claim 13, wherein authentication process ended successfully in case the number of computerized nodes in the quorum that performed the successful authentication processes is not below the threshold number.

15. The method of claim 11, wherein the public signing key is associated with a digital certificate associated with the signed version of the digital content.

16. The method of claim 11, wherein the digital certificate is also sent to a recipient for verifying that the signed version of the digital content is authentic.

* * * * *